(12) United States Patent
Stec et al.

(10) Patent No.: US 11,627,262 B2
(45) Date of Patent: Apr. 11, 2023

(54) HANDHELD COMPUTING DEVICE

(71) Applicant: FotoNation Limited, Galway (IE)

(72) Inventors: Piotr Stec, Galway (IE); Petronel Bigioi, Galway (IE); Istvan Andorko, Galway (IE)

(73) Assignee: FotoNation Limited

( * ) Notice: Subject to any disclaimer, the term of this patent is extended or adjusted under 35 U.S.C. 154(b) by 0 days.

(21) Appl. No.: 16/672,766

(22) Filed: Nov. 4, 2019

(65) Prior Publication Data

US 2021/0136298 A1 May 6, 2021

(51) Int. Cl.
| | |
|---|---|
| *H04N 5/33* | (2006.01) |
| *H04N 5/225* | (2006.01) |
| *G06F 21/32* | (2013.01) |
| *G06V 40/19* | (2022.01) |
| *G06V 40/16* | (2022.01) |

(52) U.S. Cl.
CPC ............... *H04N 5/33* (2013.01); *G06F 21/32* (2013.01); *G06V 40/166* (2022.01); *G06V 40/19* (2022.01); *H04N 5/2254* (2013.01)

(58) Field of Classification Search
CPC ........ H04N 5/33; H04N 5/2254; G06F 21/32; G06K 9/00255; G06K 9/00604
See application file for complete search history.

(56) References Cited

U.S. PATENT DOCUMENTS

| | | | |
|---|---|---|---|
| 8,220,926 B2 | 7/2012 | Blixt et al. | |
| 2003/0009540 A1 | 1/2003 | Benfield et al. | |
| 2005/0277071 A1* | 12/2005 | Yee | G06F 3/0425 |
| | | | 430/944 |
| 2007/0047805 A1* | 3/2007 | Ohtsu | G06V 30/413 |
| | | | 382/164 |
| 2008/0122994 A1 | 5/2008 | Cernasov | |
| 2018/0352131 A1* | 12/2018 | Andorko | H04N 5/2354 |
| 2019/0018564 A1* | 1/2019 | Chen | G06F 3/0412 |
| 2019/0026544 A1 | 1/2019 | Hua et al. | |

FOREIGN PATENT DOCUMENTS

| | | |
|---|---|---|
| WO | 2016020147 A1 | 2/2016 |
| WO | 2016134942 A1 | 9/2016 |
| WO | 2017144733 A1 | 8/2017 |
| WO | 2017215952 A1 | 12/2017 |

* cited by examiner

*Primary Examiner* — Md N Haque
*Assistant Examiner* — Berteau Joisil
(74) *Attorney, Agent, or Firm* — Lerner David LLP

(57) ABSTRACT

A handheld computing device comprises a display comprising an array of pixels illuminated by a plurality of visible light sources, and a plurality of infra-red light sources interleaved between the visible light sources, the IR light sources being actuable to emit diffuse IR light with a first intensity. A camera has an image sensor comprising an array of pixels responsive to infra-red light and a lens assembly with an optical axis extending from the image sensor through the surface of the display. A dedicated illumination source is located outside the display and is actuable to emit infra-red light with a second greater intensity. A processor is configured to switch between an iris region processing mode in which a subject is illuminated at least by the dedicated light source and a face region processing mode in which a subject is illuminated by the plurality of IR light sources.

20 Claims, 5 Drawing Sheets

HANDHELD COMPUTING DEVICE

FIELD

The present invention relates to a handheld computing device for infra-red based imaging of a subject.

BACKGROUND

Referring to FIG. 1, there is shown a typical handheld computing device 100 in the form of a smartphone. The device 100 comprises a slim body with one major surface of the body comprising a display 101. In the device 100, a majority of the surface is occupied by the display 101 with the display generally extending to the edges of the surface of the device. In the example of FIG. 1, notches are provided in two corners of the display 101 to accommodate a front-facing camera 102 and an illuminator 104 respectively. (Such devices may also have a rear-facing camera, but these are not of concern in the present application.) The camera 102 is typically configured to capture images of the holder of the device 100 and is commonly referred to as a selfie-camera. Images captured by the camera 102 can be used for video calls, but such images can also be used for biometric authentication of the holder of the device 100.

One form of biometric authentication is based on capturing one or more images of a holder's face and comparing features extracted from these images with corresponding features from images acquired from any authorised users of the device previously stored by such users during a registration process.

For other applications including other forms of biometric authentication or for some forms of face recognition, it can be desirable to capture images of the holder in the infra-red (IR) spectrum. (This tends to avoid problems recognising subjects wearing glasses.) For example, iris-based recognition of a subject as well as some types of face recognition are preferably performed based on IR images. (These may in fact operate on a region of interest (ROI) within an image in which a face or eye regions have been detected using visible light information before then swapping to process the corresponding ROI with the IR image.) Note that other forms of image processing than biometric authentication may be performed on IR images, including gaze analysis, or emotion recognition.

In such cases, the illuminator 104 may be configured to emit in the near-infra red (NIR), within a range between about 700 nm to 1000 nm, as well as the visible (white light) spectrum if required.

Referring to FIG. 2, the camera 102 in such cases typically comprises an RGB-IR image sensor 105 where, as well as sub-pixels which are responsive to Red, Green and Blue light, sub-pixels which are responsive to IR light are distributed across the sensor surface. This enables the camera to capture images both in the visible spectrum for rendering on the display 101, storage or transmission, as well as capturing images which can be then used for authentication. These image sensors are sometimes referred to as color filter array (CFA) sensors.

The camera 102 requires a lens assembly 106 suitable for focusing visible images on the sensor 105 across a required depth of field as well as focusing infra-red images across a depth of field which may differ from the visible depth of field. Various camera systems for providing this functionality are described in WO2016/020147 (Ref: FN-397-PCT), WO2016/134942 (Ref: FN-452-PCT), WO2017/215952 (Ref: FN-477-PCT), WO2017/144733 (Ref: FN-491-PCT) and US-2019-265445 (Ref: FN-625-US), the disclosures of which are incorporated herein by reference.

It is also possible to incorporate in such cameras a filter 108, for example, with dual visible and IR passbands separated by a stopband as shown in FIG. 2, to avoid cross-talk between IR and visible light on the image sensor 105.

As discussed in WO2016/134942 (Ref: FN-452-PCT), it can be desirable to authenticate a user based on either iris recognition, for example, for high security or finance related applications, or face recognition, for lower security applications, according to the security level required by the device 100 at any given time or by different applications running on the device. Alternatively, it can be desirable simply to switch between IR image processing based the whole of a subject's face to processing based substantially on the iris region of the subject's face.

The illumination required for each form of processing may differ, however, as will be appreciated, it may not be acceptable to encroach further within the rectangular boundary of the display 101 to incorporate the various different illuminators which may be required for different authentication applications.

It is an object of the present invention to address these problems.

SUMMARY

According to the present invention, there is provided a handheld computing device according to claim 1.

Devices according to certain embodiments of the present invention enable suitable illumination of a subject both for high security iris-based recognition where a subject may be at a different distance from the camera, typically closer, than for relatively lower security face-based recognition where the subject may be further from the camera.

The device can also be used to acquire selfie images of a subject without significantly increased costs.

The device can switch between infra-red (IR) illumination of a subject through the device display to IR illumination of the subject with a dedicated illumination source located outside the display area.

Illumination through the device display provides diffuse lighting suitable for illuminating a wider area whereas the dedicated illumination source can be more closely directed towards a specific area to facilitate acquisition of images of a subject's irises or a more distant subject's face.

Embodiments enable a user to authenticate themselves to the device in an otherwise dark environment, but nonetheless being subject to the highest levels of security.

BRIEF DESCRIPTION OF THE DRAWINGS

Embodiments of the present invention will now be described, by way of example, with reference to the accompanying drawings, in which.

DESCRIPTION OF THE EMBODIMENT

Figure 1:
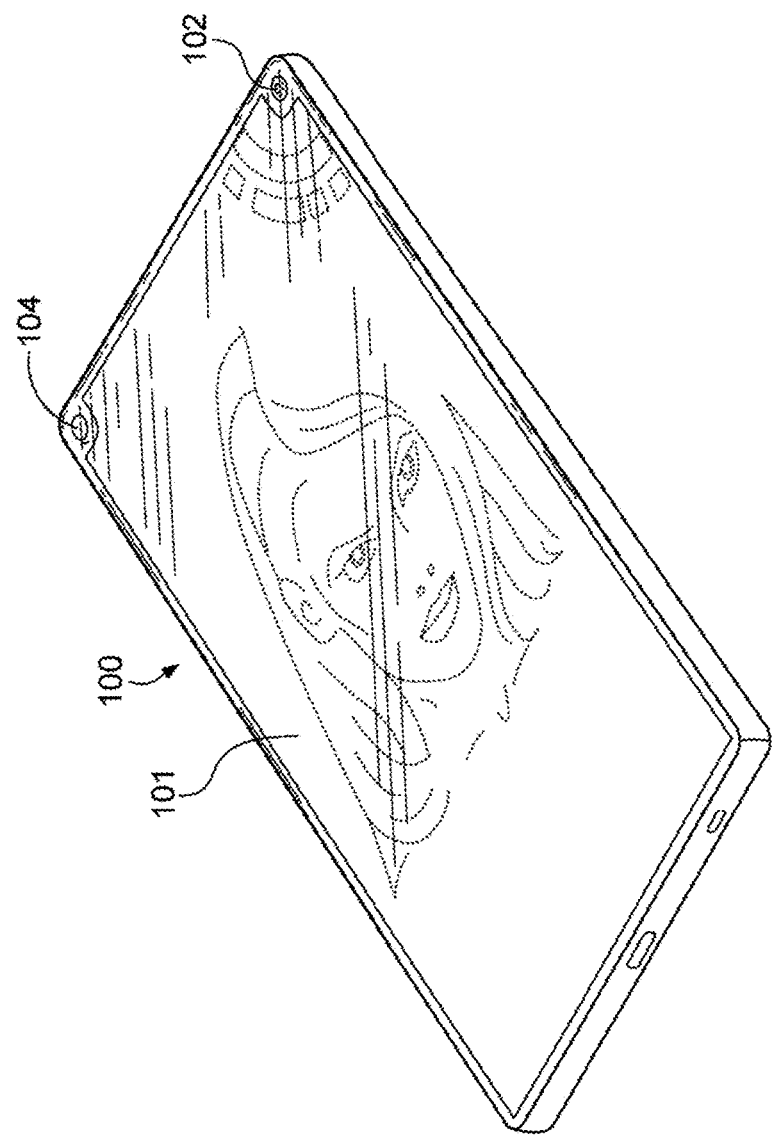
FIG. 1 illustrates a conventional smartphone.
Figure 2:
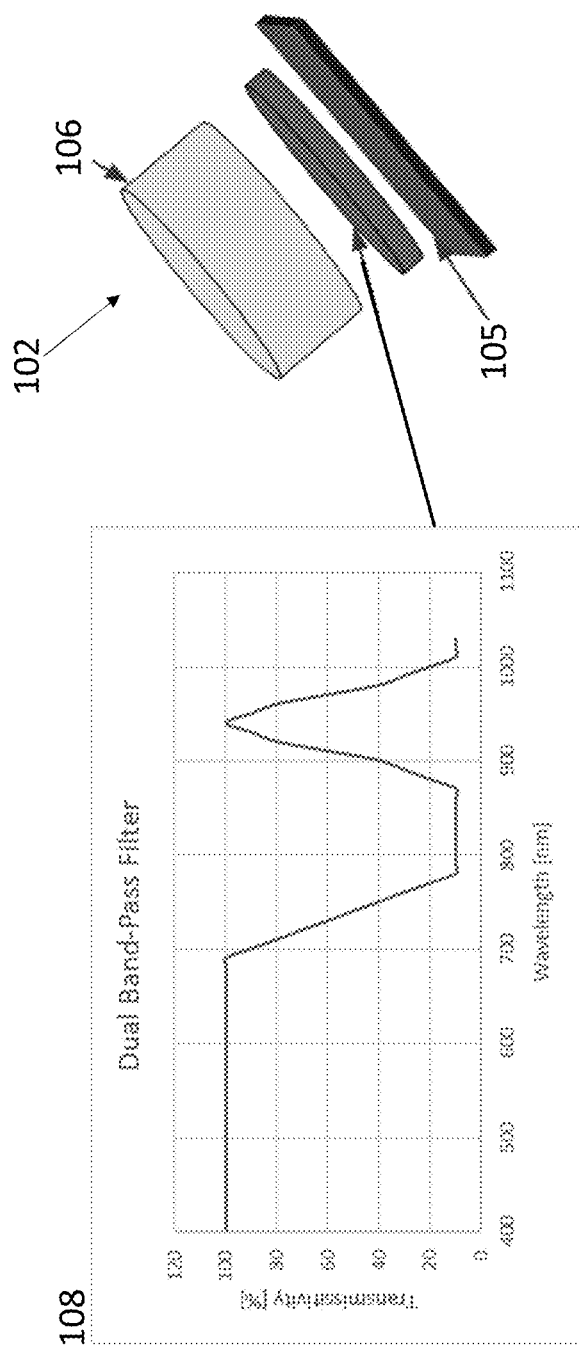
FIG. 2 illustrates schematically a camera module for a smartphone.

Referring now to FIGS. 3(a) and 3(b), there is illustrated schematically a portion of a display 101' for use within a first embodiment of a handheld computing device according to the present invention. The display 101' comprises an otherwise conventional backlit LCD display where a backlight layer 120 comprises an array of backlight light emitting diodes (LEDs) 122 arranged to emit light in the visible wavelengths, typically white light. In the embodiment, interspersed or interleaved between the backlight LEDs within the backlight layer 120 are a plurality of infrared (IR) LEDs 124. In the embodiment, the IR LEDs are configured to emit 940 nm NIR illumination with a radiant intensity of approximately 500 mW/sr through a 45° half angle and when actuated, they are suitable for illuminating a face of a subject. It will nonetheless be appreciated that in variants of this embodiment, the LED wavelength may vary and, in some cases, may be for example, 810 nm, and in other variations the half angle may vary. In any case, the visible light and IR LEDs 122, 124 are controlled separately by a processor discussed in more detail below.

The remaining layers for the display 101' conventionally comprise a first polarizer layer 126, a thin film transistor (TFT) array 128, a liquid crystal layer 130, a color filter layer 132 and another polarizer layer 134, typically with a polarity at right angles to the layer 126.

Note that for the purposes of the present embodiment, the different colour filters in the layer 132 and polarizer layers 126, 134 as well as the layers 128, 130 need to be transparent to IR light emitted by the LEDs 124.

Also, it will be appreciated that the layout pattern of the IR LEDs 124 within the array of LEDs 122 does not need to be as shown. The layout need not be uniform nor need it involve the same ratio of IR LEDs 124 to backlight LEDs 122 and this can vary according to the structure of the display 101'. Nonetheless, the density of IR LEDs 124 should not be so great that non-uniformity in illumination provided by the visible LEDs 122 becomes apparent.

Referring now to FIGS. 4(a) and 4(b), there is illustrated schematically a portion of a display 101" for use within a second embodiment of a handheld computing device according to the present invention.

In this case, the display 101" is edge lit by a plurality of visible light LEDs 122' interleaved with a plurality of IR LEDs 124'. From the side view of FIG. 4(b), it will be seen that in such panels an LCD layer 130' is sandwiched between a pair of polarizer layers 126'/134' and sits in front of diffuser layer 140 directing light from the LEDs 122'/124' through the display surface in the direction of the arrow 140.

In FIG. 4(a), the display 102" is shown as being illuminated along 2 edges (the LEDs along the lower edge are not shown in FIG. 4(b)), but in variants the display 102" may be illuminated along more or fewer edges.

In any case, in edge lit embodiments, light from the IR LEDs 124' is diffused by the same diffusor layer 140 as is normal in an LCD display and again the layers 126', 130' and 134' need to be configured to permit IR light to radiate through the display with minimal obstruction.

Figure 3:
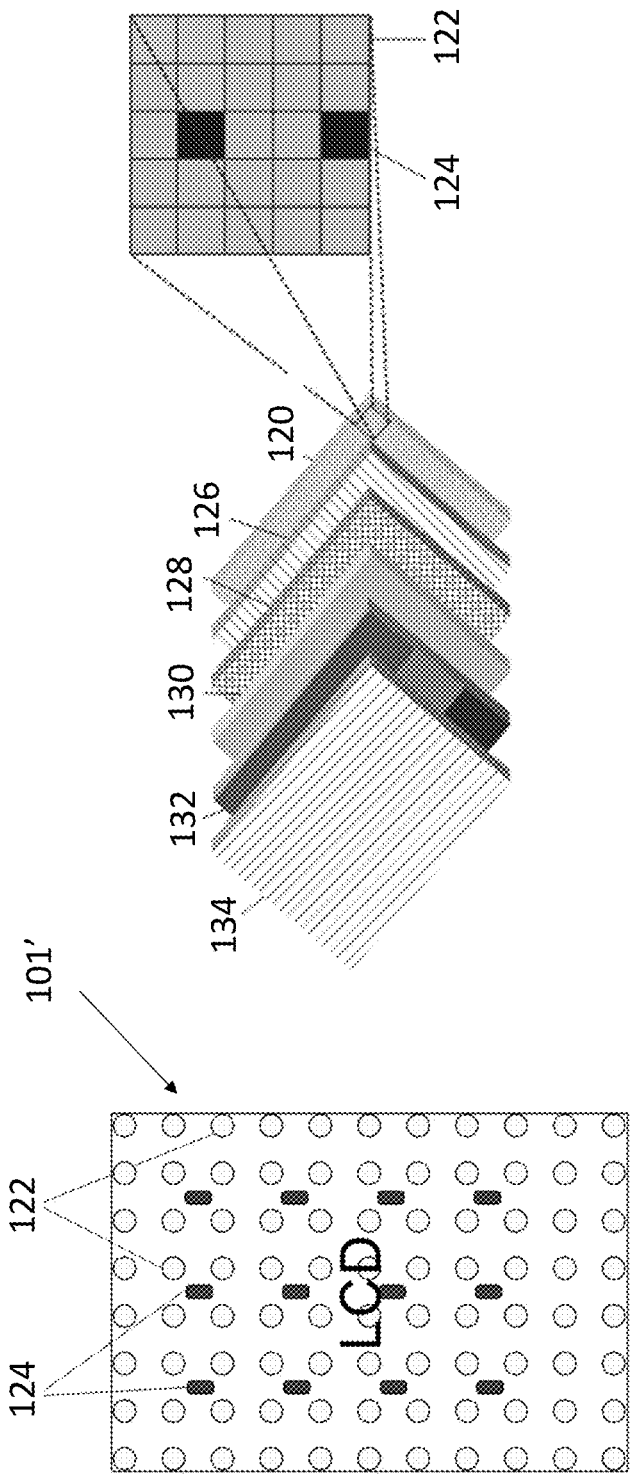
FIGS. 3(a) and 3(b) illustrate schematically a front view and an exploded view respectively of a portion of a display for one embodiment of a handheld computing device according to the present invention.
Figure 4:
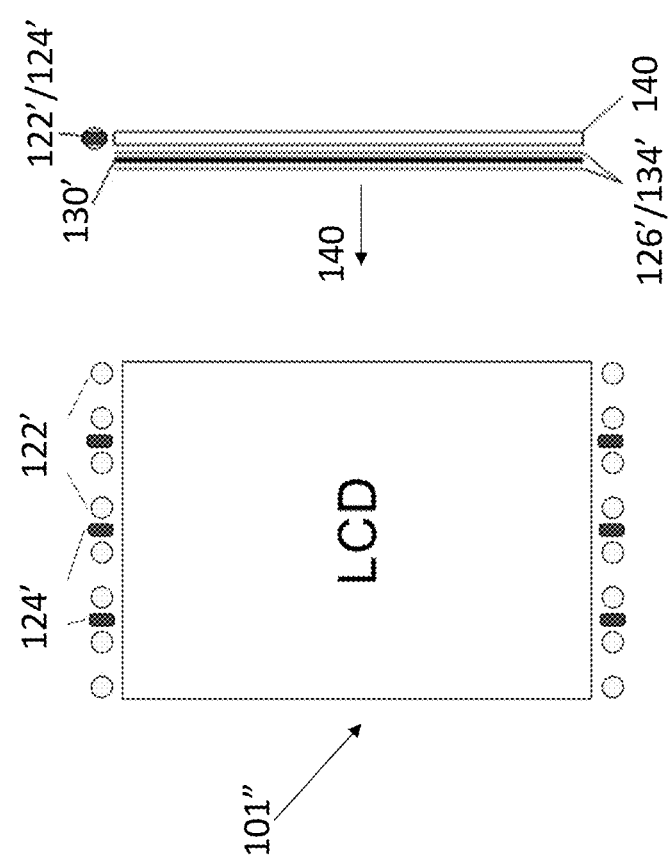
FIGS. 4(a) and 4(b) illustrate schematically a front view and a side view respectively of a portion of a display for a second embodiment of a handheld computing device according to the present invention.

Each display 101' or 101" of FIGS. 3 and 4 can replace the display 101 of the prior art. In either case, the illuminator 104 should be suitable for illuminating a subject's iris within the focus range of the camera 102 for iris recognition. One suitable illuminator 104 would emit with approximately 2500 mW/sr radiant intensity at a 10° half angle, a suitable example, being available from OSRAM under the product name OSLUX® SFH 47805.

Note that in variants of the described embodiment, the illuminator 104 could be located immediately beside the camera 102 on the surface of the device, rather than in the opposite corner as in FIG. 1; or in still further variations, the illuminator could be formed within the bezel of the device adjacent the camera 102 and so extend from a side surface rather than the front major surface of the device.

In any case, by comparison to the single illuminator 104, light from the LEDs 124 and 124' will be diffused, coming from an area source instead of point source—this can reduce possible glares reflected from a subject.

Note that while in the examples of FIGS. 3 and 4, the display is described as being an LCD display, it will be appreciated that the invention is equally applicable to other forms of display which could incorporate diffuse sources of IR light. For example, the invention may equally be implemented in an OLED display. Indeed some such displays are partially transparent with cameras installed behind the display area, so that rather than being disposed outside the display area as in the illustrated embodiment, the camera could be disposed within the display area.

Again, the camera used in embodiments of the invention can be of a generally conventional construction and typically, it is desirable to employ a camera with a 4000 px×3000 px resolution image sensor behind a lens assembly with a field of view (FOV) of approximately 80°×65°. Typically, the camera should produce a resolution of at least 1 lp/mm @ MTF60 for visible light images and for the purposes of IR based face recognition and at least 2 lp/mm @ MTF60 for iris recognition.

Figure 5:
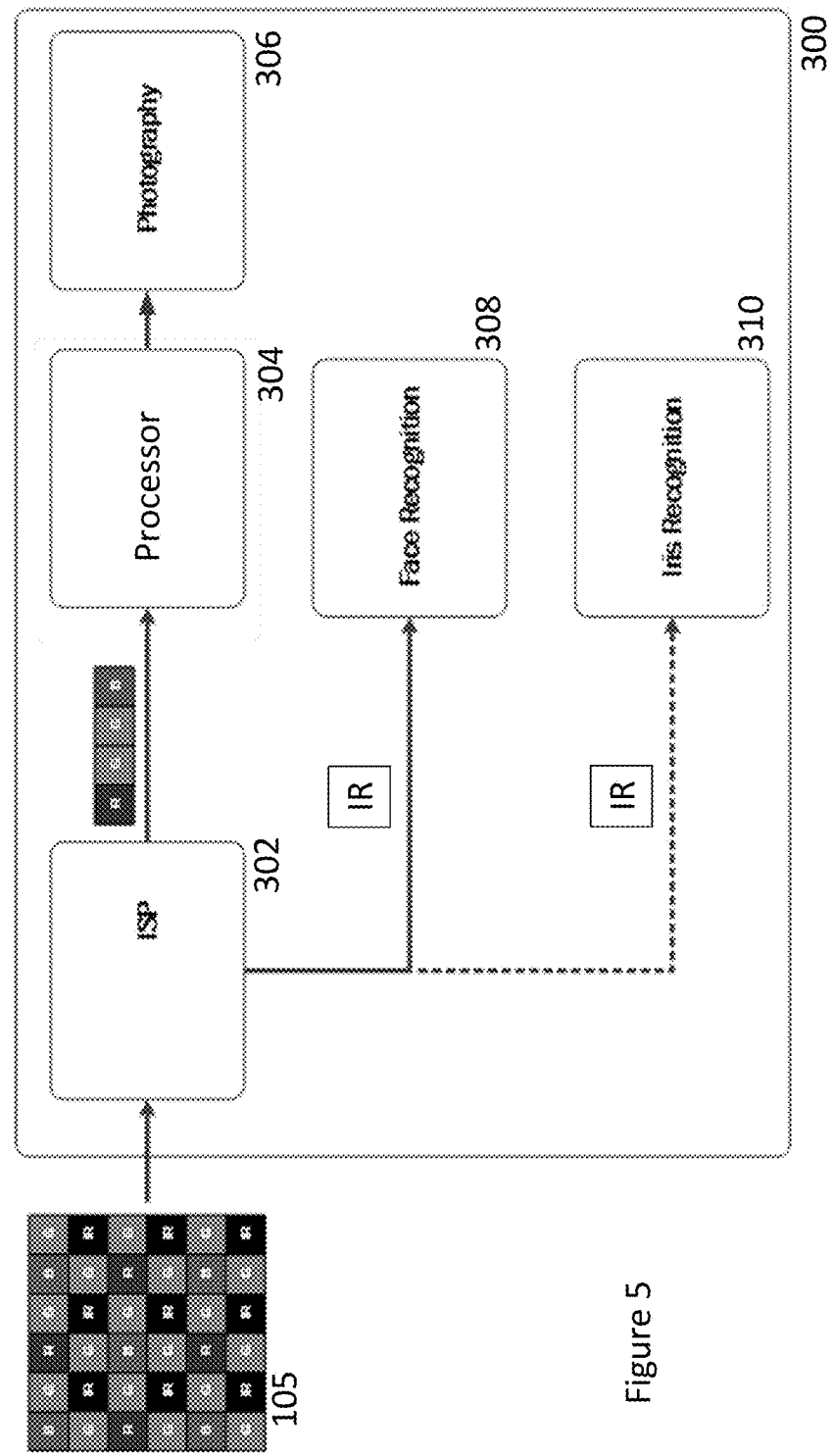
FIG. 5 illustrates a processor for a handheld computing device according to an embodiment of the present invention.

Referring now to FIG. 5, there is shown a configuration of processor 300 which can be employed within a handheld computing device according to an embodiment of the present invention.

In this case, a custom image processor 302 receives interleaved RGB-IR image input from the sensor 105 and generates a pseudo-Bayer RGGB output that can be fed into a conventional image processor 304 for use in any suitable downstream photographic application(s) 306. Additional illumination for such images can be provided either through a separate light source or if the IR LEDs 124, 124" are configured to also emit across visible wavelengths, these can be actuated as required, for example, in accordance with ambient light levels.

On the other hand, image information sensed by the IR sensitive sub-pixels of the sensor 105 can be directed by the image processor 302 either to a face recognition unit 308 or an iris recognition unit 310—this may in fact form sub-modules of a dedicated biometric authentication unit.

Note that although it is likely that at any given time only one of the units 304, 308, 310 will be required by application (s) running on the device, any one or more of the units 304, 308, 310 may operate on any frame of image information acquired by the image sensor 105.

If the face recognition unit 308 is to process acquired image information, then, especially for subjects who are close enough to the device, the processor can actuate only the backlight IR LEDs 124 or 124' within the display to suitably illuminate the face of the subject for recognition without glare. On the other hand, if a face is detected within a field of view at a distance too great to be well illuminated by backlight IR LEDs 124 or 124' (this can be determined according to the size of the face detected and tracked from a previous frame), the processor 300 may attempt to correctly illuminate the face using the dedicated illuminator 104 as well as possibly the LEDs 124, 124'.

On the other hand, if the iris recognition unit 310 is to process acquired image information, then the processor can actuate the dedicated illuminator 104 located outside the display area to suitably illuminate the iris of a subject for recognition. Typical subject-device distances for iris recognition would be up to 40 cm.

Note that in some implementations, the processor 300 may also actuate the backlight IR LEDs 124 or 124' for iris recognition to supplement the light provided by the dedicated illuminator 104.

It will therefore be appreciated that the computing devices including displays such as the displays 101', 101" including LEDs 124, 124' as well as the illuminators 104 enable a conventional RGB-NIR sensor 105 to be used as a selfie camera while supporting dual biometric modes—either face or iris based recognition.

Note that in some embodiments IR image information generated within the sensor 105 can be exclusively used for recognition purposes within the units 308, 310. However, in variations of such embodiments, the IR image information could be used to refine visible information within the ISP 302 or processor 304 before it is provided for further processing by photography applications 306.

Note that as described in WO2016/134942 (Ref: FN-452-PCT), the fields of view (FOV) for visible wavelength images may in fact differ from the FOV for IR image information acquired at the same time.

While the above embodiments have been described in terms of a smartphone, it will be appreciated that the invention is equally applicable to any handheld devices such as tablets including a display and front-facing camera.

The invention claimed is:

1. A handheld computing device comprising:
a display comprising an array of pixels illuminated by a plurality of visible light sources within the display, and further comprising a plurality of infra-red (IR) light sources within the display and interleaved between said visible light sources, said IR light sources being actuable to emit diffuse IR light with a first intensity through a surface of said display,
a camera having an image sensor comprising an array of pixels responsive to at least infra-red light and a lens assembly with an optical axis extending from said image sensor through said surface of said display,
a dedicated illumination source located outside said display and being actuable to emit infra-red light with a second intensity and through a half-angle encompassing said optical axis, said second intensity being greater than said first intensity of diffuse IR light emitted by said IR light sources within the display, and
a processor configured to distinctly switch between (i) an iris region processing mode in which at least one iris is illuminated at least by said dedicated illumination source at said second intensity, (ii) a first face region processing mode in which a face is illuminated by said plurality of IR light sources at said first intensity, the iris region processing mode being distinct from the first face region processing mode, and (iii) a second face region processing mode where a face is detected at a greater distance from the handheld computing device than in said first face region processing mode, wherein in said second face region processing mode, a subject is illuminated by at least said dedicated illumination source, and wherein the iris region processing mode, the first face region processing mode, and the second face region processing mode are three distinct processing modes.

2. The handheld computing device according to claim 1 wherein said dedicated illumination source is located adjacent said camera at a corner of said handheld computing device and configured to emit from the surface of the display.

3. The handheld computing device according to claim 1 wherein said dedicated illumination source is located at a corner of said handheld computing device opposite said camera and configured to emit from the surface of the display.

4. The handheld computing device according to claim 1 wherein said dedicated illumination source is located in a bezel of said handheld computing device adjacent said camera.

5. The handheld computing device according to claim 1 where, in said iris region processing mode, a subject is further illuminated by said plurality of IR light sources.

6. The handheld computing device according to claim 1 wherein said dedicated illumination source is further configured to emit visible light.

7. The handheld computing device according to claim 1 wherein said first and second face region processing modes are face recognition modes.

8. The handheld computing device according to claim 1 wherein said iris region processing mode is an iris recognition mode.

9. The handheld computing device according to claim 1 wherein said display is a backlit display comprising a backlighting layer with an array of light sources disposed behind said surface of said display, wherein a plurality of said light sources interleaved among visible light sources are actuable to emit infra-red IR light through a first half-angle from said surface of said display, said first half-angle being greater than said half-angle for said dedicated illumination source.

10. The handheld computing device according to claim 1 wherein said display is an edge light display wherein said plurality of IR light sources are interleaved between said visible light sources along at least one edge of said display.

11. The handheld computing device according to claim 1 wherein said image sensor comprises pixels sensitive to visible light.

12. The handheld computing device according to claim 11 wherein said processor is configured to refine visible image information acquired by said image sensor with infra-red information acquired by said image sensor.

13. The handheld computing device according to claim 1 wherein said display is a liquid crystal display.

14. The handheld computing device according to claim 1 wherein each of said plurality of visible light sources and said plurality of IR light sources are light emitting diodes (LEDs).

15. The handheld computing device according to claim 1 said dedicated illumination source comprises an LED.

16. A system comprising:
a display comprising an array of pixels illuminated by a plurality of visible light sources within the display, and further comprising a plurality of infra-red (IR) light sources within the display and interleaved between said visible light sources, said IR light sources being actuable to emit diffuse IR light with a first intensity through a surface of said display,
a camera having an image sensor comprising an array of pixels responsive to at least infra-red light and a lens assembly with an optical axis extending from said image sensor through said surface of said display, a dedicated illumination source located outside said display and being actuable to emit infra-red light with a second intensity and through a half-angle encompassing said optical axis, said second intensity being greater than said first intensity of diffuse IR light emitted by said IR light sources within the display, and a processor configured to distinctly switch between (i) an iris region processing mode in which at least one iris is illuminated at least by said dedicated illumination source at said second intensity, (ii) a first face region processing mode in which a face is illuminated by said plurality of IR light sources at said first intensity, the iris region processing mode being distinct from the first face region processing mode, and (iii) a second face region processing mode where a face is detected at a greater distance from the system than in said first face region processing mode, wherein in said second face region processing mode, a subject is illuminated by at least said dedicated illumination source, and wherein the iris region processing mode, the first face region processing mode, and the second face region processing mode are three distinct processing modes.

17. The system according to claim 16 wherein said display is a backlit display comprising a backlighting layer with an array of light sources disposed behind said surface of said display, wherein a plurality of said light sources interleaved among visible light sources are actuable to emit infra-red IR light through a first half-angle from said surface of said display, said first half-angle being greater than said half-angle for said dedicated illumination source.

18. The system according to claim 16 wherein said display is an edge light display wherein said plurality of IR light sources are interleaved between said visible light sources along at least one edge of said display.

19. The system according to claim 16 wherein said image sensor comprises pixels sensitive to visible light.

20. The system according to claim 16 wherein:
said first and second face region processing modes are face recognition mode modes; and
said iris region processing mode is an iris recognition mode.

\* \* \* \* \*